(12) United States Patent
Walker et al.

(10) Patent No.: US 8,523,666 B2
(45) Date of Patent: Sep. 3, 2013

(54) PROGRAMMING FRAMEWORK FOR CLOSED SYSTEMS

(75) Inventors: John Mitchell Walker, Duval, WA (US); Paul L. Bleisch, Sammamish, WA (US); Thomas Wayne Miller, Jr., Redmond, WA (US); Matthew Picioccio, Sammamish, WA (US); Shawn Hargreaves, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1305 days.

(21) Appl. No.: 11/753,861

(22) Filed: May 25, 2007

(65) Prior Publication Data

US 2008/0293484 A1    Nov. 27, 2008

(51) Int. Cl.
*G06F 21/00* (2013.01)
(52) U.S. Cl.
USPC ................ 463/29; 705/51; 719/328; 713/176
(58) Field of Classification Search
USPC ........... 463/29, 30, 31, 32; 705/51; 719/328; 713/176
See application file for complete search history.

(56) References Cited

U.S. PATENT DOCUMENTS

| 5,680,534 | A | 10/1997 | Yamato et al. | 395/173 |
|---|---|---|---|---|
| 6,041,412 | A | 3/2000 | Timson et al. | |
| 6,115,036 | A | 9/2000 | Yamato et al. | 345/328 |
| 6,321,334 | B1 | 11/2001 | Jerger et al. | |
| 6,473,800 | B1 | 10/2002 | Jerger et al. | |
| 6,505,300 | B2 * | 1/2003 | Chan et al. | 713/164 |
| 6,646,653 | B2 | 11/2003 | San et al. | 345/649 |
| 6,871,350 | B2 | 3/2005 | Wong | |
| 7,116,782 | B2 | 10/2006 | Jackson et al. | 380/251 |
| 7,587,724 | B2 * | 9/2009 | Yeap | 719/328 |
| 7,752,661 | B2 | 7/2010 | Hemsath et al. | |
| 2001/0044819 | A1 | 11/2001 | Gong | |
| 2002/0019941 | A1 * | 2/2002 | Chan et al. | 713/185 |

(Continued)

FOREIGN PATENT DOCUMENTS

| JP | 6-168124 A | 6/1994 |
|---|---|---|
| JP | 2003-150424 A | 5/2003 |

(Continued)

OTHER PUBLICATIONS

Svensson, "Computer Simulation of a Web Cache Server with SES/Workbench", University of Houston, Aug. 2001, 177 pages.*

(Continued)

*Primary Examiner* — James D Nigh
(74) *Attorney, Agent, or Firm* — Woodcock Washburn, LLP

(57) ABSTRACT

Mechanisms are disclosed that allow for execution of unsigned content and the securing of resources in a closed system when such unsigned content is executing on the system. For example, an application programming interface is used between an access layer implementing unsigned content and an operating system of the closed system. The application programming interface may have sub-interfaces that correspond to sub-layers of the access layer, including a graphics sub-interface, an audio sub-interface, an input sub-interface, and a storage sub-interface. These sub-interfaces present access calls made by the sub-layers to the protected resources of the closed system. By providing the application programming interface, unsigned content, e.g., video games can run on a closed system that is typically designed to run only signed content.

19 Claims, 13 Drawing Sheets

(56) References Cited

U.S. PATENT DOCUMENTS

| | | | |
|---|---|---|---|
| 2002/0086729 A1 | 7/2002 | Emmerson et al. | 463/41 |
| 2003/0069074 A1* | 4/2003 | Jackson | 463/43 |
| 2003/0105780 A1 | 6/2003 | Tamura et al. | |
| 2003/0203756 A1* | 10/2003 | Jackson | 463/42 |
| 2004/0038740 A1 | 2/2004 | Muir | 463/40 |
| 2004/0216145 A1* | 10/2004 | Wong et al. | 719/321 |
| 2006/0100011 A1* | 5/2006 | Morrow et al. | 463/29 |
| 2006/0258427 A1* | 11/2006 | Rowe et al. | 463/16 |
| 2006/0270478 A1* | 11/2006 | Barhydt et al. | 463/41 |
| 2008/0140958 A1* | 6/2008 | Yates et al. | 711/161 |

FOREIGN PATENT DOCUMENTS

| | | |
|---|---|---|
| JP | 2004-533046 A | 10/2004 |
| JP | 2005-507114 A | 3/2005 |
| JP | 2005-166051 A | 6/2005 |
| JP | 2006-018765 A | 1/2006 |
| JP | 2006-164266 A | 6/2006 |
| JP | 2007-122348 A | 5/2007 |
| WO | WO 03/036475 A1 | 5/2003 |
| WO | WO 2004/004855 A1 | 1/2004 |
| WO | WO 2007/017676 A2 | 2/2007 |
| WO | WO2008/130767 A1 * | 10/2008 |

OTHER PUBLICATIONS

Scacchi, W., "Understanding the Requirements for Developing Open Source Software Systems", *IEEE*, Dec. 2001, Paper No. 29840, 1-26, http://kb.cospa-project.org.

Twilleager, D. et al., "Java™ Technologies for Games", *ACM Computers in Entertainment*, 2004, 2(2), 1-9, http://delivery.ac.org.

"Open Source & Low Cost Game Engines", http://delivery.acm.org, 60 pages.

Scott K et al., "Safe virtual execution using software dynamic translation", Computer Security Applications Conference, 2002. Proceedings. 18th Annual Dec. 9-13, 2002, Piscataway, NJ, USA, IEEE, Dec. 9, 2002, pp. 209-218, XP010627032.

Susumu Kawamura, "Resolution to Limitations on Browsers: Manners for Development of Java Rich Clients", Java Press, Japan, Gijutsu-Hyoron Co., Ltd., Apr. 15, 2004, vol. 35, pp. 168, 169,and 172.

Susumu Kawamura, Java Professional Handbook, Gijutsu-Hyoron Co., Ltd., Feb. 15, 2004, First Edition, pp. 156-159.

Japanese Patent Application No. 2010-509571: Office Action dated Dec. 19, 2012, and English language translation.

\* cited by examiner

PROGRAMMING FRAMEWORK FOR CLOSED SYSTEMS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007, Microsoft Corp.

BACKGROUND

Gaming consoles are prevalent in today's computing environments. Game consoles are typically closed systems that only allow signed games controlled by hardware vendors to execute on such consoles. This restriction may be done for various reasons, whether to preserve the business model of having a tightly controlled environment for publishers, where piracy of intellectual property is kept to a minimum, or controlling the types of games that can be played on a gaming system, for instance, to allow content that meets parental expectations for children playing such content. Additionally, only allowing signed code to run helps to control and mitigate the potential for cheating on games in an online community, where certain assumptions, such as community scores or digital currency, are essential to be accurate.

However, these tight restrictions present on game consoles prevent the larger creative community as a whole from developing games or game-like applications on closed game consoles. Thus, it is important to address the need of allowing developers, gamers, general hobbyist, and student game developer communities, among others, to write games for a traditionally closed system. Additionally, it is important to address the problem of a burgeoning market of homebrew developers who spend the time and effort in order to hack game consoles in order to allow the running of unsigned code on such consoles (when they otherwise wouldn't have to expand such time and effort with the presently disclosed subject matter, below).

SUMMARY

Mechanisms are provided that allow for unsigned content running on a closed system to execute resource calls for resources operating in protected, kernel mode. In one aspect of the presently disclosed subject matter, when running unsigned content on a closed system in user mode, only an approved list of APIs are exposed to allow resource calls to resources operating in kernel mode. The API exposed validates the resource call and translates the resource call, if necessary, from user mode language format to kernel mode language format. In one exemplary and non-limiting example, there may be several APIs that interface with sub-layers of protected resources, such as a graphics layer, an audio layer, an input layer, and a storage layer. In one exemplary and non-limiting aspect, the mentioned API can be non-platform specific, providing for an interface from developed content to be implemented on various platforms. In one exemplary and non-limiting aspect, the mentioned API can be modified to change the access granted to platform resources.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

Figure 1:
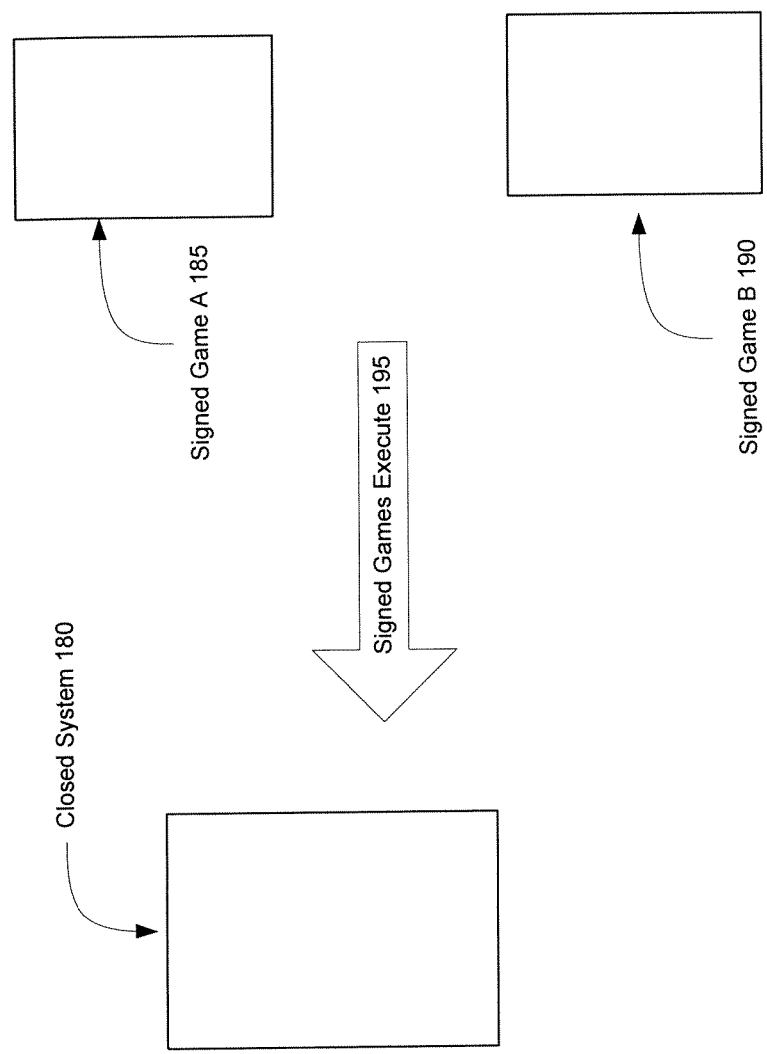
FIG. 1 illustrates a system where only signed software components, namely, signed games, are able to run on a typically closed system.

Typically, game consoles only allow signed games to execute. To ensure that signed games do not expose a closed console in any exploitive way, games are pushed through a process known as certification. Certification requires that games follow a stringent set of rules before games can be signed. These stringent rules are in place to prevent titles from unknowingly creating an exploit that could allow the closed console to be hacked in a fashion that is detrimental to the manufacturer, as well as content publishers. In particular, preventing piracy of content on closed consoles is important.

Games running on closed consoles may require access to resources such as memory, CPU access, GPU, optical disc drives, input devices, and persistent storage (such as hard disk drive). Because unsigned games do not go through the typical certification process required of signed games, system, methods, and computer readable media are disclosed herein to show ways of ensuring that data flowing from unsigned games into the protected resources is limited and controlled.

In one exemplary and non-limiting aspect of the present disclosure, an application programming interface (API) supports resource requests made through a resource management layer to limit the exposure of protected resources to unsigned, possibly malicious, source code. In one exemplary and non-limiting aspect of the present disclosure, the API may also be configured to limit the access of protected resources made through the resource management layer in a closed gaming console by unsigned games. The API provides a well-known entry point, allowing an unsigned game to access the protected resources of the console. The entry points available made available to the resource management layer may be fixed and pre-determined by the console manufacturer to help limit and control the data flow and to help prevent the creation of new, unsecured entry points.

In one exemplary and non-limiting aspect of the present disclosure, the resources management layer may have sub-layers. To facilitate calls between the resources management layer and the protected resources of a closed console, the API will have sub-interfaces that support the various sub-layers of the resources management layer. Some of these sub-interfaces will be for the audio, input, storage, graphics, and math sub-layers of the resource management layer.

Finally, because the API is an interface between the protected resources of the closed console operating in a kernel or supervisor mode and the resource management system or layer operating in user or managed mode, the API may have security measures in place to prevent unfettered access of possibly malignant code to protected resources normally available in user/kernel mode. Thus, the API may provide for a level of security by limiting the type and scope of protected resource calls allowed.

Aspects of Unsigned Content in a Closed System

This section of the presently disclosed subject matter focuses on the executing of unsigned content in a closed system in such a way that such execution is secure (i.e. such that resources in the closed system are protected). In order to gain a better appreciation for these aspects, it is instructive to compare a closed system that allows only signed content with a closed system that allows both unsigned and signed content.

Thus, FIG. 1 illustrates a closed system where only signed software components, namely, signed games, are able to run. Specifically, a closed system 180 is depicted against which various signed games, such as game A 185 and game B 190, are able to execute 195. These games 185, 190 are typically authorized by the closed system 180 manufacturer, however, in some aspects they can be authorized by game developers or some other third parties. In any case, the system 180 is deemed "closed" in the sense that not every software application can run on it, as might be the case with a general purpose personal computer (a PC).

A typical signing process, as was mentioned above, serves a variety of purposes, such as limiting pirating of intellectual property and controlling who has access to the appropriate content. However, despite the numerous advantages of such a closed system 180, it unnecessarily restricts development of other "unsigned" games (games not officially authorized by a gaming authority). Such unsigned games can be games that build on top of existing games (even "signed" games, if permission is obtained from a publisher of such signed games) or they may be newly developed games that could not otherwise run on a closed system.

Figure 2:
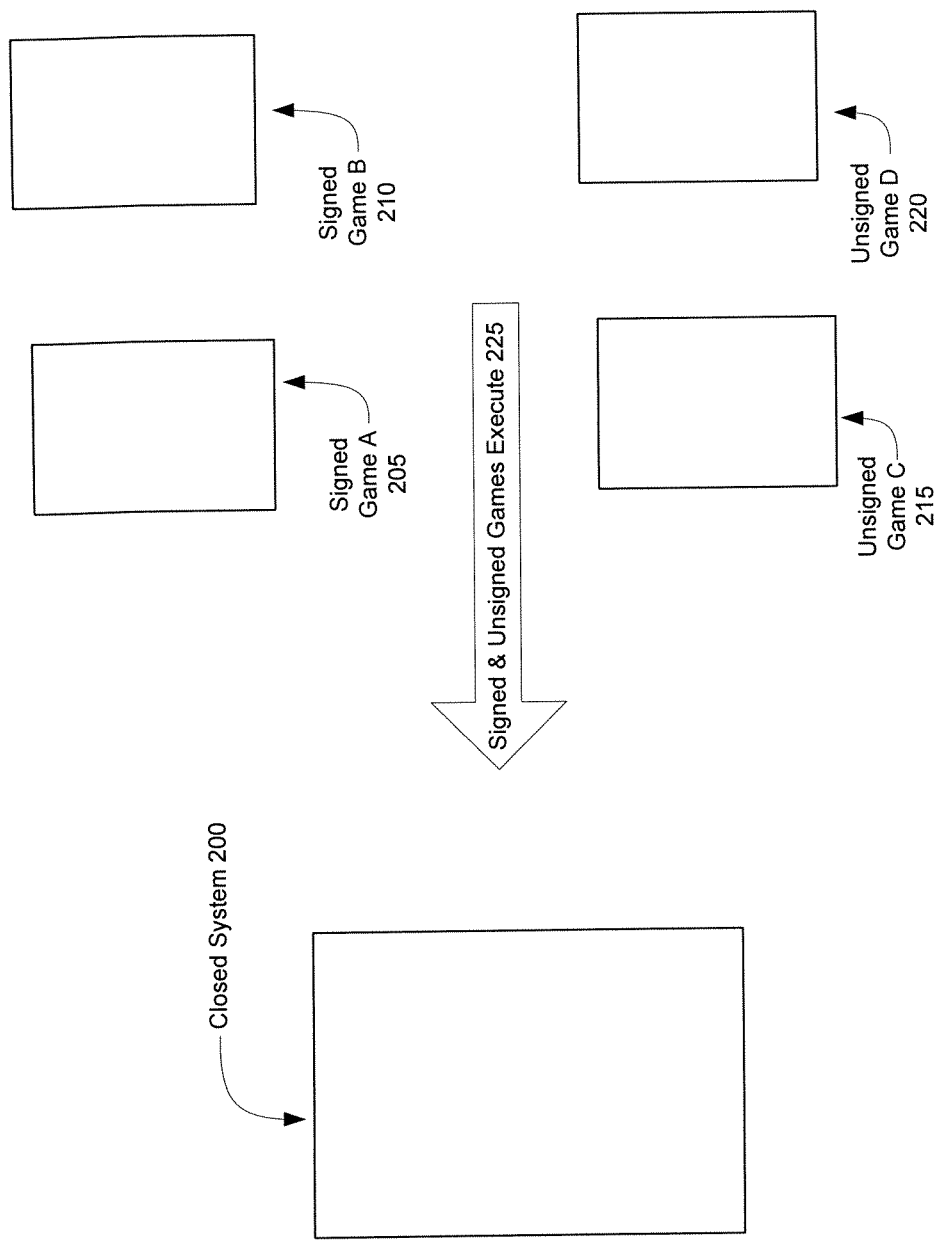
FIG. 2 illustrates a system where both signed and unsigned games are able to run on a closed system.

Thus, in contrast to FIG. 1, FIG. 2 illustrates a system where both signed and unsigned games are able to run on a closed system. A different closed system 200 vis-à-vis the closed system of FIG. 1, closed system 180, can run not only signed games A 205 and B 210, but also unsigned games C 215 and D 220. Although it should be noted, that the depicted closed systems 180 and 200 are merely exemplary and are not limited to any particular manufacturer or generation of computing device (abstract boxes for such system could have been shown instead of the concrete depictions in FIGS. 1 and 2).

As was mentioned above, allowing unsigned gaming content C 215 and D 220 to run on a system 200 that typically does not allow unsigned content to run, expands gaming capabilities of such a system 200. However, allowance of running unsigned gaming content 215, 220 also present security problems. Since games C 215 and D 220 are unsigned, i.e. they are not verified to be what they purport to be, malicious or undesired code and data can end up running on the gaming system 220. As will be explained shortly, with respect to FIG. 4, a security layer must be present. And this security layer not only allows unsigned games to run in the first place, but also additionally has the benefit of preventing undesired code and data from interacting with gaming system 200 resources.

Figure 3:
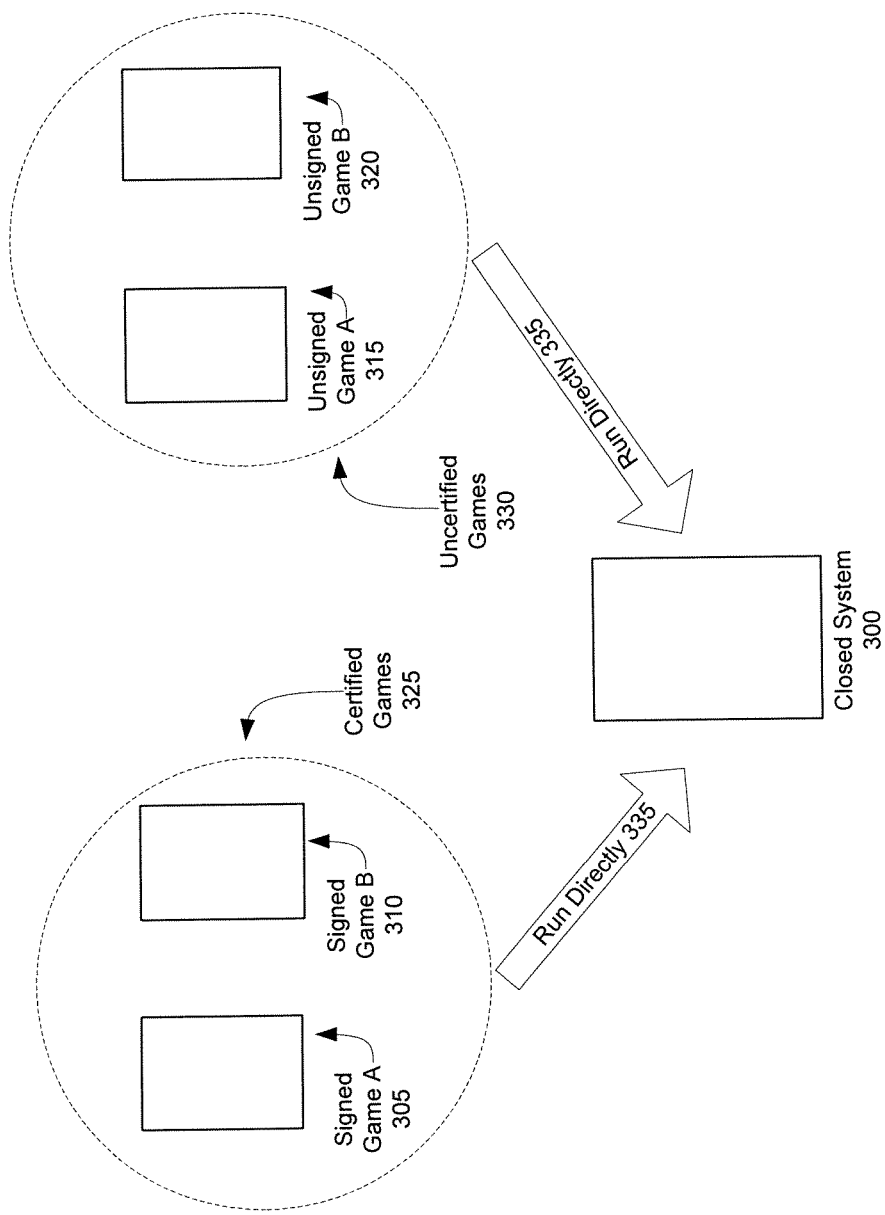
FIG. 3 illustrates that signed games are certified, and that unsigned games are not certified.

Next, FIG. 3 illustrates that signed games are certified, and that unsigned games are not certified. Specifically, games A 305 and B 310 are signed by some authentication or validation authority so that these games can run 335 on a specified closed system designated by the authority. Such signed games A 305 and B 310 are said to be certified 325. In contrast, uncertified games 330 are games that are not signed off by some such authority, namely, games A 315 and B 320, and so typically they cannot execute on the closed system 300. With the above and below aspects of the present disclosure, such games 315, 320 can run on the closed system 300 (in addition to the originally signed games A 305 and B 310).

Figure 4:
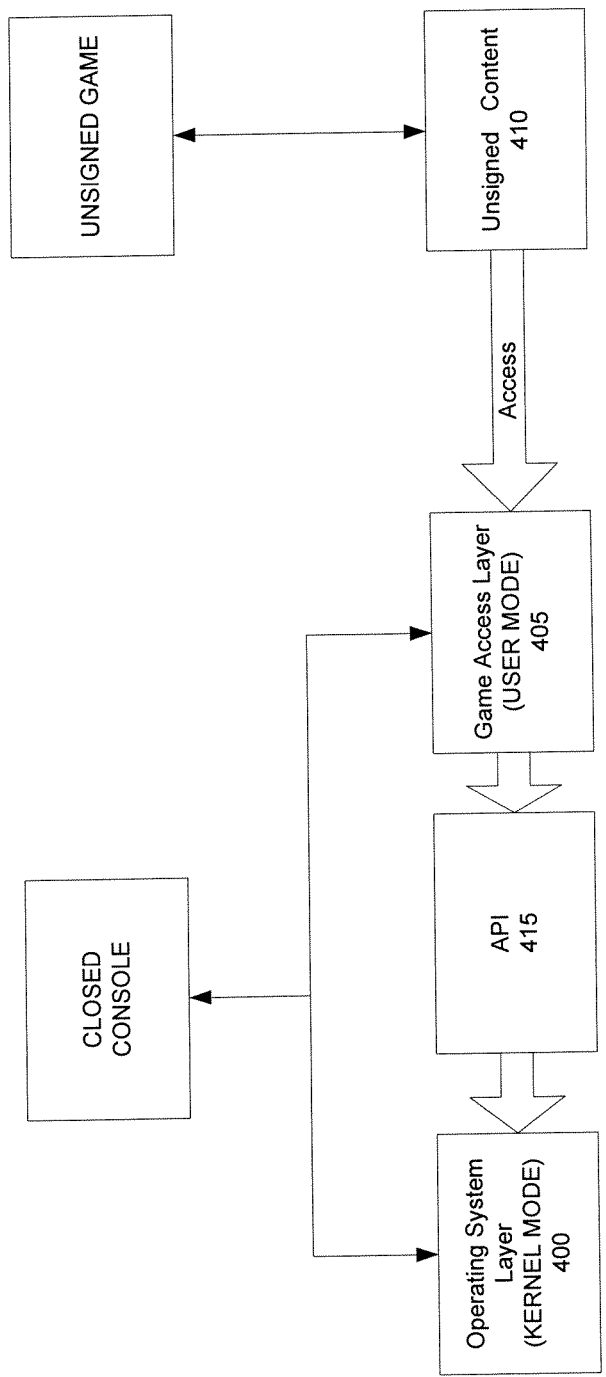
FIG. 4 illustrates that there is an API between a game access layer and a gaming operating system.

Turning now to FIG. 4, it illustrates that there is an application programming interface (API) between a game access layer, operating in user mode or unsigned mode, and a gaming operating system, operating in kernel or supervisor mode. API 415 supports operating system layer 400 resource requests made by game access layer 405. As discussed above, to protect operating system layer 400 from malicious code, or other code that improperly utilizes operating system layer 400 resources, possibly found in unsigned content, a barrier must be erected between the protected portion of the gaming system, operating system layer 400, and the unprotected or user portion of the gaming system. To facilitate and create the barrier, the code allowed to be executed by unsigned content must be managed.

Managed code is code provided by a content provider, such as the closed console provider, provided to a developer to be used to develop unsigned content. Because of the risk of unsigned content maliciously or inadvertently interfering or accessing protected closed console resources, such as physical memory, the unsigned developer, who is typically unidentified, can only be allowed a certain degree of flexibility when developing code. This is because the unsigned content will not undergo a certification process to become signed content. Thus, a content provider, to limit the ability of the unsigned content developer to system resources, provides the content developer with managed or predetermined code.

This managed or predetermined code is essentially a set of guidelines established by a console provider that, if used by an unsigned content developer, will preferably not allow inappropriate access to closed console protected resources. There may be several different ways to implement managed code. For instance, a console provider may predetermine the pathways and level of access normally needed by applications and provide that code to unsigned content developers. The prepackaged code will not be modifiable to prevent the generation of new pathways and levels of access. The manners in which the managed code is provided to an unsigned content developer vary and do not impact the present disclosure. What is relevant for the present disclosure is that managed code and kernel/supervisor native code interact with protected console resources differently.

Figure 5:
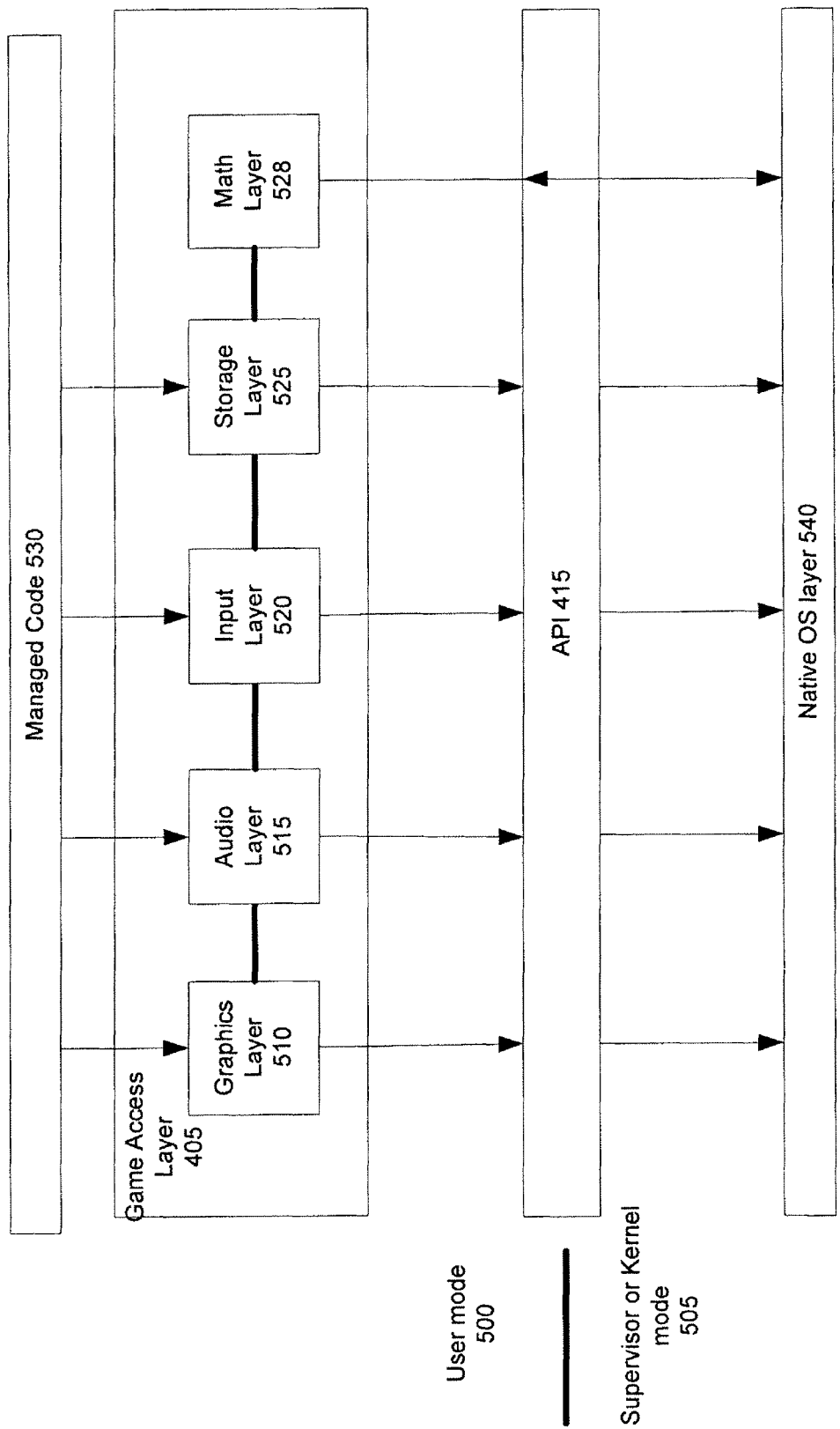
FIG. 5 illustrates the access layer shown as an abstraction in FIG. 4, in more detail with its various sub-layers, such as graphics, audio, input, and storage.

Continuing with FIG. 4, with reference to game access layer 405, game access layer 405 is an abstraction (which is explained in more detail with reference to FIGS. 5 and 6, below). In short, game access layer 405 may be broadly understood to be a type of interface for unsigned content 410 to interact with. In actuality, it represents virtualized hardware for the unsigned content 410 so that the unsigned content 410 does not have to be strictly compatible with the operating system layer 400 (as would be the case with a signed gaming content, e.g. games A 305 and B 310 shown in FIG. 3).

API 415 is an interface provided to support operating system layer 400 requests made by game access layer 405. Because the managed code available for execution by unsigned content is different than native language code available by signed content, for the reasons stated above, API 415 will take managed code resource requests and transition the requests into the native language mode used by operating system layer 400. This is described more fully below with respect to the exemplary and non-limiting types of API 415 sub-interfaces.

The manner in which API 415 supports resource calls to operating system layer 400 from game access layer 405 is explained in more detail with reference to FIG. 5. As mentioned above, because there may be several types of protected resources, i.e., storage, audio, math, graphics, input, to be able to make calls to the various resources, the access layer 405 can comprise of at least six layers: a graphics layer 510, an audio layer 515, an input layer 520, a storage layer 525, and a math layer 528. Each of these layers is responsible for a different task.

For example, the graphics layer 510 may be responsible for rendering the graphics (including but not limited to flat shading, normal mapping, texture mapping, and so on); the audio layer 515, as is suggested by the title, may be responsible for the audio on a closed system (although it should be noted that such audio may or may not be associated with unsigned content—it could be independent audio obtained from a CD, a DVD, or some computer device file); the input layer 520 can be responsible for handling input from users, such as controller button selection, clicking using input devices, and so on; the storage layer 525 can be responsible for storing certain gaming content or recalling certain gaming content (additionally, it can be used to allow for the running of legacy software by storing code and/or data that brings gaming content up to par with new console hardware); and lastly, the math layer 528 may allow for the performance of certain math functions, e.g., to allow for more efficient map rendering (if graphics are involved). It should be noted that sub-layers 510, 515, 520, 525, 527, 528 are exemplary and are used to illustrate aspects of the present disclosure.

Each of these layers 510, 515, 520, 525, 527, 528 makes the respective resource calls between user mode 500 and supervisor (e.g. kernel) mode 505. More clearly, game access layer 405 and the associated layers 510, 515, 520, 525, 527, 528 makes resource calls in managed code 530 to resources in native OS layer 450. The resource call is validated, and if any parameter of the resource call is found to be invalid or outside an acceptable range, the call is immediately terminated. Additional information regarding validation may be found in reference to FIG. 9a. Upon the validation of the resource call, an approved API is exposed to the resource call, and the resource call is processed.

One of the reasons for the separation between user mode and kernel mode is so that unsigned code does not take over the underlying native OS layer 540 and any associated console resources for purposes unintended by console manufacturers or other interested parties. Thus, per FIG. 5, some managed code 530 that is associated with the aforementioned unsigned code is provided to the access layer 405, which may comprise of the various sub-layers 510, 515, 520, 525, 527, 528 discussed above. Managed code 530 is provided from the user mode 500 side, and filtered down through the sub-layers via the API of the present disclosure to the supervisor mode 505 side. These six layers 510, 515, 520, 525, 527, 528 make resource calls to native OS layer 540 via API 415. API 415 receives resource calls from game access layer 405 and various sub-layers 510, 515, 520, 525, 527, 528. API in turn interacts with native OS layer 540 to release the resources for use by the resource calls.

Figure 6:
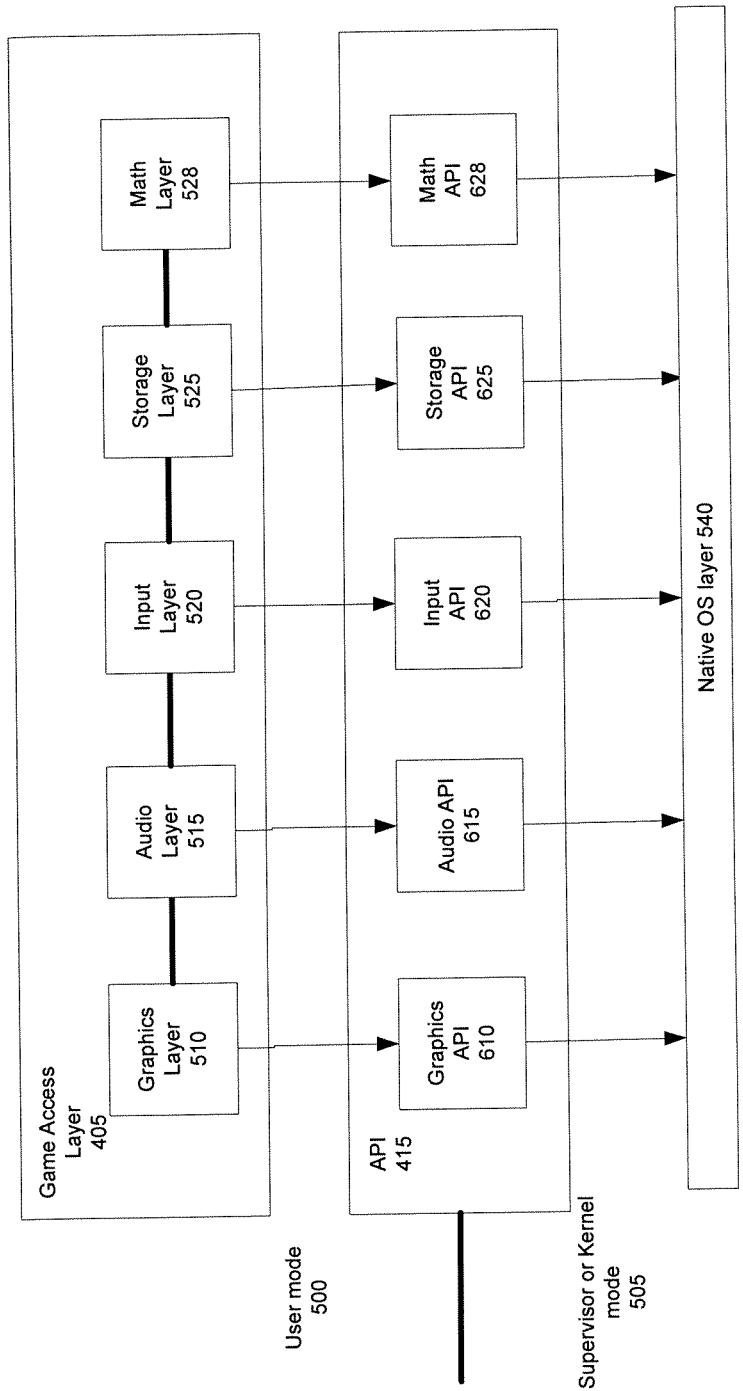
FIG. 6 illustrates the API with sub-interfaces that interact with the various sub-layers of FIG. 5.

Because various resources will need to be made available to unsigned content developers using managed code 530, calls made by sub-layers 510, 515, 520, 525, 527, 528 are handled by sub-interfaces of API 415, as shown in FIG. 6. FIG. 6 illustrates in more detail the sub-interfaces of API 415 that provide resource calls from sub-layers 510, 515, 520, 525, 527, 528 to native OS layer 540. In more detail, the sub-interfaces of API 415 correspond to the type of sub-layer. Sub-interface graphics API 610 provides graphical resource calls from graphics layer 510 to native OS layer 540; sub-interface audio API 615 provides audio resource calls from audio layer 515 to native OS layer 540, input API 620 for input layer 520, storage API for storage layer 525, math API 628 for math layer 528. One of skill in the relevant art should appreciate that the present disclosure is not limited to the sub-interface APIs shown.

Sub-interface APIs 610, 615, 620, 625, and 628 provide an interface from managed code to native code, an exemplary and non-limiting description of an application of each type of sub-interface is provided.

Storage API

Figure 7:
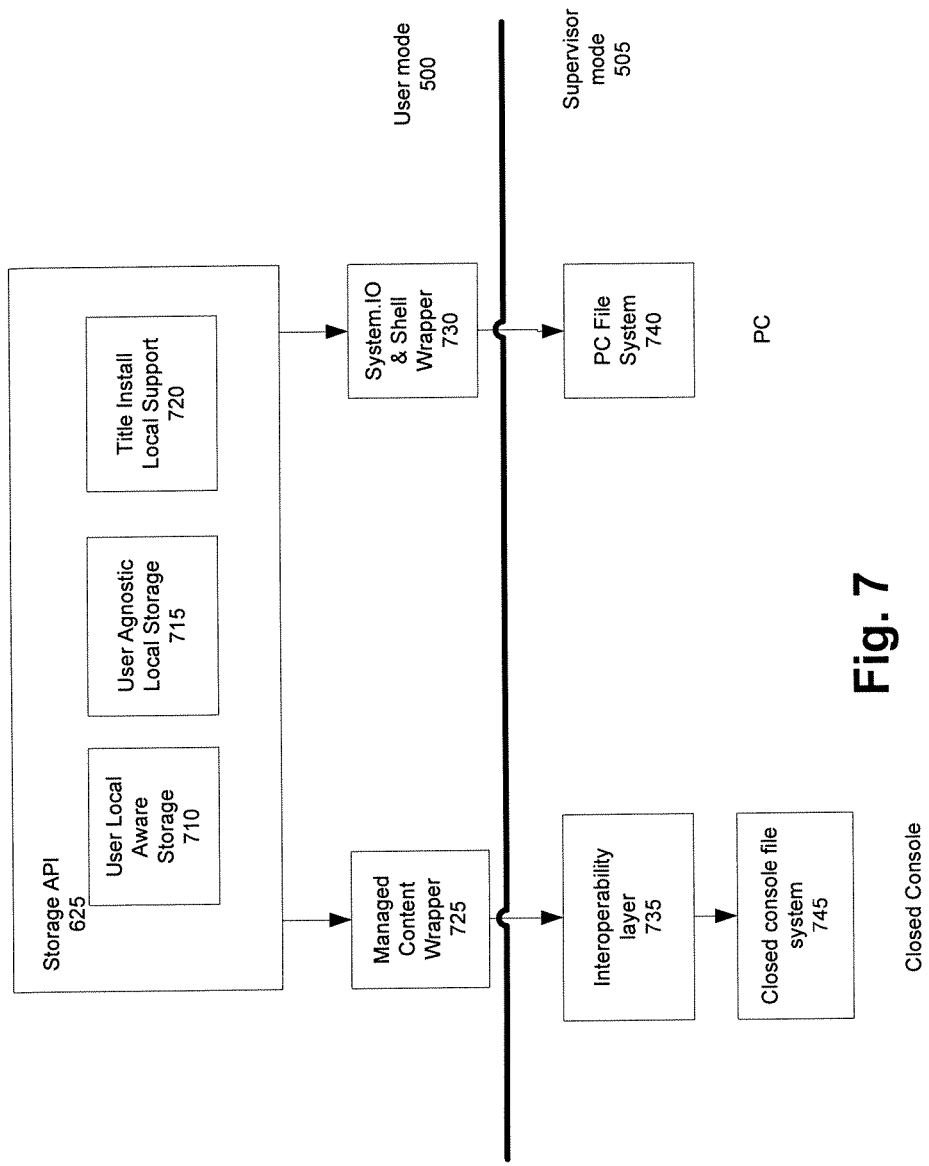
FIG. 7 illustrates in more detail the aspects of a storage API sub-interface.

As an exemplary and non-limiting example of a type of API that may be implemented, storage API 625 of FIG. 6 is herein described more fully with reference to FIG. 7. Storage API 625 provides developers with the ability to save and manage unsigned content in protected system resources without having to have knowledge of the underling devices and formats, i.e. on a closed gaming console as opposed to a general purpose PC. This is the managed code aspect of providing code to be used by developers in managed mode that already contains within the code the necessary language to access the protected system resources. Further, because developed code necessary to access system resources is provided to developers, Storage API 625 may also provide a level of security by isolating certain resources and files. The following description is one exemplary and non-limiting way of providing Storage API 625 that meets some or all of the aforementioned goals.

FIG. 7 is an exemplary and non-limiting illustration of a logical architecture overview of Storage API 625. Storage API 625 groups games to be saved on protected resources into various local logical containers. Each container may contain zero or more saved games and may be user aware local storage 710 or user agnostic local storage 715. The user may vary according to the task being performed. For example, if unsigned content is being developed, a user may be the developer. In another example, if the unsigned game is being played, the user may be the gamer. Continuing with the description, user agnostic local storage 715 can be accessed by any user profile that executes the saved game. User profile aware containers can only be accessed by the user profile that created the game. Typically, each user profile will have access to one user profile aware container and one user profile agnostic container.

Once an instance of storage 710 or 715 is created, individual saved games can be created inside of it. This is done simply by asking storage 710 or 715 to create a file with a given name. Having an instance of the saved game storage also allows a developer to get a stream to a saved game, delete a saved game, enumerate all saved games inside of the storage, or rename a saved game. Further, storage 710 or 715 may be emptied of all files or deleted entirely.

A saved game, or title, when executing will need access to the game's storage location on the relevant file system. Typically, titles will put support files like textures, movies and assemblies in the title's executable director or subdirectory in the relevant file system. If a title can not access or does not know of the location of this data, the game can not work properly. To provide the necessary information to the saved title, title install local support 720 is provided. Support 720 provides certain information necessary for a game, including the name of the title the saved game belongs to, the id of the title the saved game belongs to, the name of the saved game, comments about the saved game, and a thumbnail representing the saved game.

Closed console storage formats are typically different than general purpose or PC formats. Storage API 625, to provide for the ability of the user to store information in various formats, has logical managed content wrapper 725 for use on a closed console and System. IO & Shell wrapper 730 for use on a PC. Wrappers, in general terms, may be viewed as interpreters that take content developed in one language or format and provide the necessary language to allow that content to be used in another format. This provides the non-platform specific functionality mentioned above. In other words, a developer may write code to save game content to storage and transport that code between platforms, i.e. between a closed console and PC. Thus wrapper 725 and wrapper 730 interpret and provide the necessary formatting to save the content to their respective storage system.

The requirements on a storage system for a closed console, closed console file system 745, will likely be different than the requirements on a PC, PC file system 740, thus the storage formats will likely be different. Unsigned content developers may not have enough experience or time to write the necessary code to save their content to either a closed console or PC, wrappers 725 and 730 are provided for by Storage API 625 so the developer only has to execute a save content function without regard to the underlying format.

Additionally, the underlying resources of a closed console are typically different than a PC and may require additional functionality to execute a storage call by Storage API 625, interoperability layer 735 is provided which interfaces with closed console file system 745 in supervisor mode 505 and wrapper 725 in user mode 500. API 626 calls into interoperability layer 735 to obtain access to closed content file system 745 necessary to save content. The game is formatted in the manner described below.

Saved Game File Format

Figure 8:
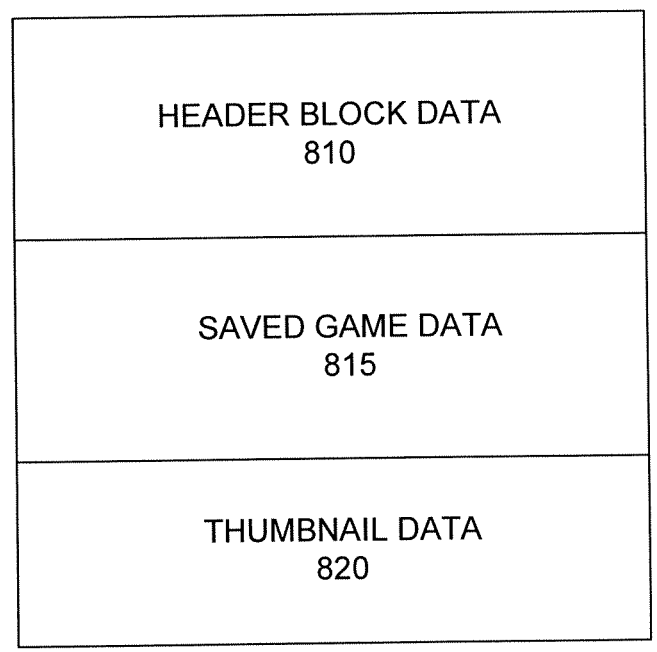
FIG. 8 illustrates a file format used by the storage API.

Storage API 625 will create files that will follow a specific saved game format as shown in FIG. 8. File 800 is split into three sections: header block data 810, saved game data 815, and thumbnail data 820. Header block 810 is typically written first, followed by saved game data 815. Saved game data 810 is typically the title defined content that constitutes the saved game state. Thumbnail data 820 associated with the saved game typically appears in the stream after saved game data 810.

Saving the Game File

Figure 9:
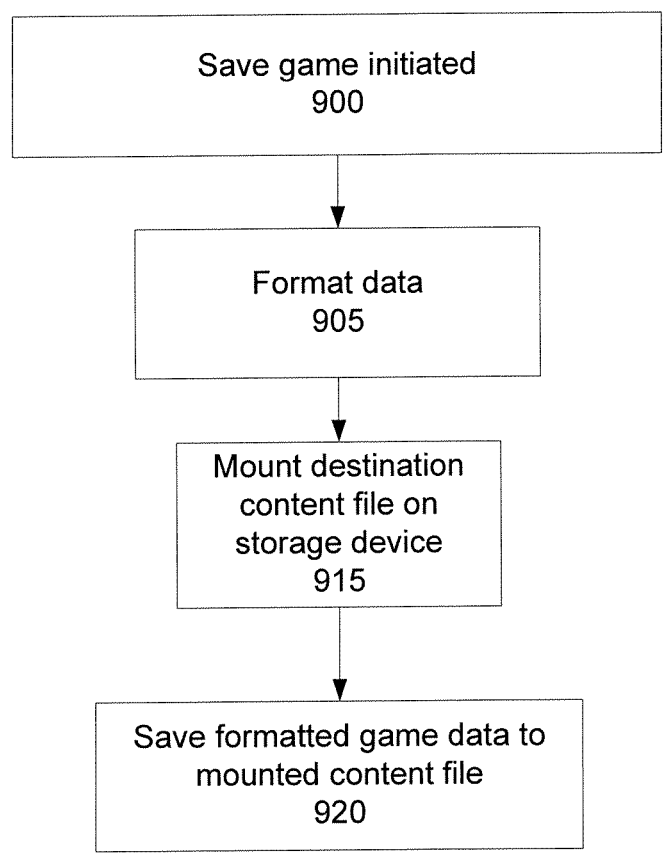
FIG. 9 illustrates an exemplary method of saving content.

A simplified process for saving a game is shown in FIG. 9. The process steps are shown in the abstract for simplicity. One of skill in the relevant art should appreciate that the process shown in FIG. 9 may be executed using various methods and that detailed description of each step is not necessary to enable the present disclosure. Referring to FIG. 9, at step 900, a save game is executed. At step 905 Storage API 625 formats the game data into the format described in FIG. 8 above. Once the data is formatted, at step 915, destination file is mounted in the relevant file system, i.e. a closed console system or general purpose system. Once the destination file is mounted, at step 920 the game is saved to the mounted content file in either user aware local storage 710 or user agnostic local storage 715 in FIG. 7.

Figure 9A:
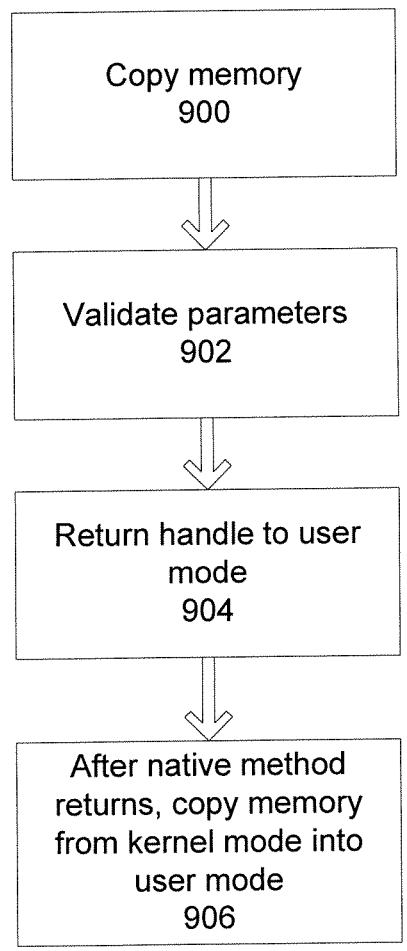
FIG. 9a illustrates an exemplary method of validating data from user mode prior.

It may be preferable to validate a resource call, such as the one described in FIG. 9, prior to passing the data from user mode to the native system APIs, such as the ones described above. Validation of the resource call helps to reduce or eliminate the probability that an API may be exposed to an invalid resource call inadvertently. FIG. 9a is an exemplary and non-limiting example of a way to validate a resource call prior to passing the resource call data to native system APIs.

At step 900, the data stored in user mode is copied into a portion of memory residing in kernel mode allocated for validation. This is done to attempt to prevent any type of memory referencing any data from a portion of the user mode to maintain the separation between the user mode and kernel mode. After the memory is copied, at step 902, the parameters of the data are validated against known good or acceptable values. Some parameter checks may include enum value set validation, range checking, null reference checking, etc.

After the validation step of 902 is completed, all pointers to kernel mode resources are translated to a safe handle and stored in a handle table. The handle is then returned to the user mode and is used as the reference when the native, or kernel mode, pointer needs to be used. Subsequent calls attempting to use the handle are checked to ensure that the call references a valid handle. A primary reason for the use of handles in user mode rather than the native pointer is to provide an additional layer of separation between the user mode and kernel mode. A further reason is to prevent malicious code from making one valid resource call to retrieve a native pointer, then once the native pointer is known to the code, using the native pointer information to maliciously access native resources. Once the data is checked and validated, the native system call is invoked; causing any data on the heap returned to the user mode is copied into a user mode allocation so that there are no references to kernel mode memory.

Types of Content Providing Architecture

Various types of content providing architectures are contemplated herein. One type may have an intervening server 1010 between the computing sources 1002, 1004, 1006 and the closed system 1008, while other types may have direct connection between a computing source and the closed system 1008. Those of skill in the art will readily appreciate the various ways in which content can be delivered to a closed system. Once content is provided to the closed system 1008, system 1008 can take this content and run it through access layer 405 and API 415 shown in FIG. 4, the various graphics 610, audio 615, input 620, math 628, and storage 625 sub-interfaces shown in FIG. 6. The manner in which information is received, stored, and passed down to the system 1008 resources will depend on the restrictions placed by system 1008 manufacturers in the access layer, and thus on the contents of unsigned content.

Exemplary Computing Device

Figure 11:
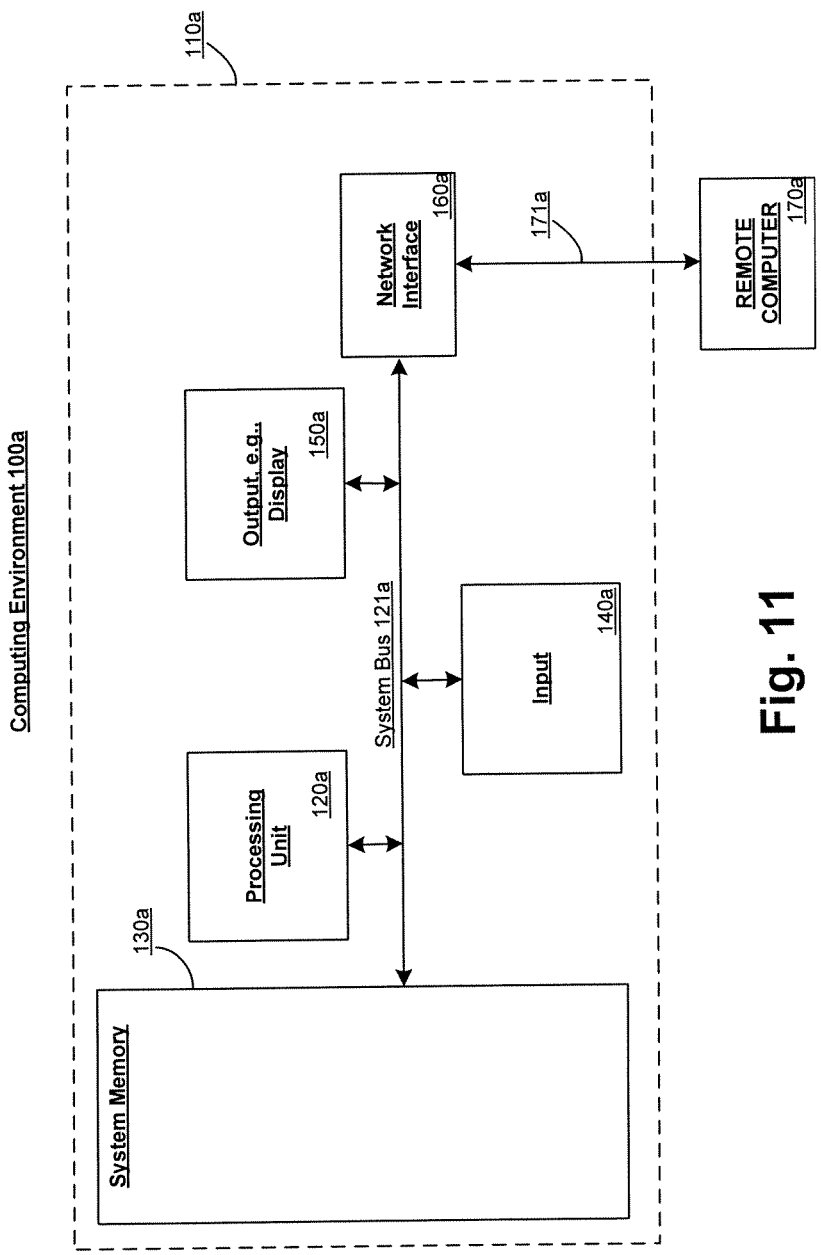
FIG. 11 illustrates exemplary ways in which unsigned content may be introduced.

As mentioned, the presently disclosed subject matter applies to any device wherein it may be desirable to run unsigned content on an otherwise closed system. It should be understood, however, as indicated above, that other equivalent content to that of unsigned content can work with presently disclosed computing objects of all kinds. Accordingly, the below general purpose remote computer described below in FIG. 11 is but one example, and the present subject matter may be implemented with any client or portable device, whether standalone or having network/bus interoperability and interaction. Thus, the present subject matter may be implemented in an environment of networked hosted services in which very little or minimal client resources are implicated, e.g., a networked environment in which the client device serves merely as an interface to the network/bus, such as an object placed in an appliance.

Although not required, the present subject matter can partly be implemented via an operating system, for use by a developer of services for a device or object, and/or included within application software that operates in connection with the present subject matter. Software may be described in the general context of computer-executable instructions, such as program modules, being executed by one or more computers, such as client workstations, servers or other devices. Those skilled in the art will appreciate that the present subject matter may be practiced with other computer system configurations and protocols.

FIG. 11 thus illustrates an example of a suitable computing system environment 100*a* in which the various aspects described with reference to previous figures may be implemented, although as made clear above, computing system environment 100*a* is only one example of a suitable computing environment for execution device and is not intended to suggest any limitation as to the scope of use or functionality of these various aspects. Neither should the computing environment 100*a* be interpreted as having any dependency or requirement relating to any one or combination of components illustrated in the exemplary operating environment 100*a*.

With reference to FIG. 11, an exemplary remote device for implementing the aforementioned aspects includes a general purpose computing device in the form of a computer 110*a*. Components of computer 110*a* may include, but are not limited to, a processing unit 120*a*, a system memory 130*a*, and a system bus 121*a* that couples various system components including the system memory to the processing unit 120*a*. The system bus 121*a* may be any of several types of bus structures including a memory bus or memory controller, a peripheral bus, and a local bus using any of a variety of bus architectures.

Computer 110*a* typically includes a variety of computer readable media. Computer readable media can be any available media that can be accessed by computer 110*a*. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110*a*. Communication media typically embodies computer readable instructions, data structures, program modules or other data in a modulated data signal such as a carrier wave or other transport mechanism and includes any information delivery media.

The system memory 130*a* may include computer storage media in the form of volatile and/or nonvolatile memory such as read only memory (ROM) and/or random access memory (RAM). A basic input/output system (BIOS), containing the basic routines that help to transfer information between elements within computer 110*a*, such as during start-up, may be stored in memory 130*a*. Memory 130*a* typically also contains data and/or program modules that are immediately accessible to and/or presently being operated on by processing unit 120*a*. By way of example, and not limitation, memory 130*a* may also include an operating system, application programs, other program modules, and program data.

The computer 110*a* may also include other removable/non-removable, volatile/nonvolatile computer storage media. For example, computer 110*a* could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121*a* through a non-removable memory interface such as an interface, and a magnetic disk drive or optical disk drive is typically connected to the system bus 121*a* by a removable memory interface, such as an interface.

In addition to a user being able to provide input to the closed computing device via controllers, a user may enter commands and information into the computer 110*a* through input devices such as a keyboard and pointing device, commonly referred to as a mouse, trackball or touch pad. In addition to such peripheral devices, other input devices may include a microphone, joystick, game pad, satellite dish, scanner, or the like. These and other input devices are often connected to the processing unit 120*a* through user input 140*a* and associated interface(s) that are coupled to the system bus 121*a*, but may be connected by other interface and bus structures, such as a parallel port, game port or a universal serial bus (USB). A graphics subsystem may also be connected to the system bus 121*a*. A monitor or other type of display device is also connected to the system bus 121*a* via an interface, such as output interface 150*a*, which may in turn communicate with video memory. In addition to a monitor, computers may also include other peripheral output devices such as speakers and a printer, which may be connected through output interface 150*a*.

The computer 110*a* may operate in a networked or distributed environment using logical connections to one or more other remote computers, such as remote computer 170*a*, which may in turn have media capabilities different from device 110*a*. The remote computer 170*a* may be a personal computer, a server, a router, a network PC, a peer device or other common network node, or any other remote media consumption or transmission device, and may include any or all of the elements described above relative to the computer 110a. The logical connections depicted in FIG. 9 include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Multimedia (Closed) Console Environment

Figure 12:
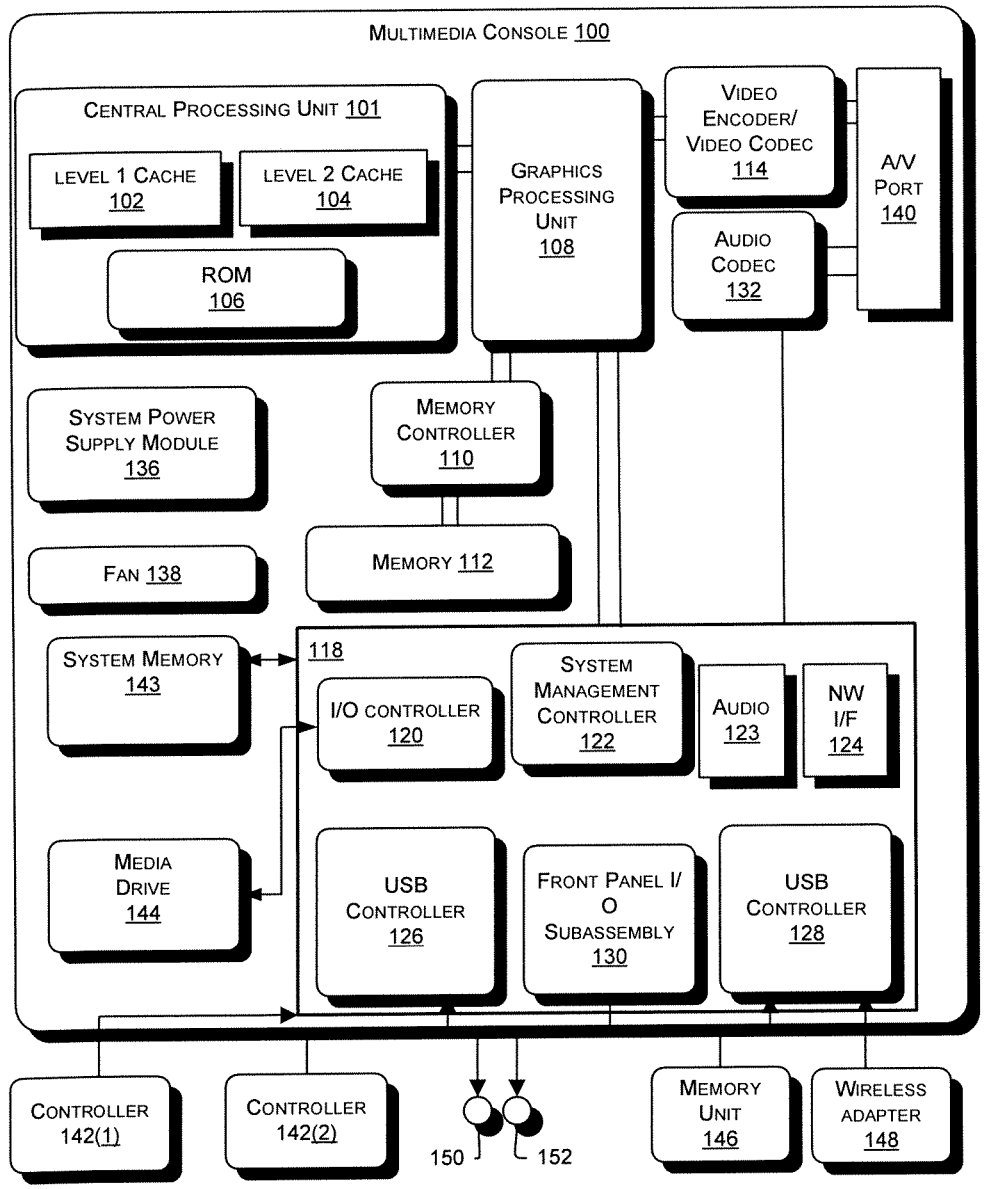
FIG. 12 illustrates a block diagram showing an exemplary non-limiting multimedia console device on which said unsigned content can execute in accordance with another aspect of the presently disclosed subject matter.

Referring next to FIG. 12, shown is a block diagram illustrating another exemplary non-limiting computing device, i.e., an exemplary multimedia console, which may be closed to a limited amount of software components being signed by some signing authority (whether the closed device maker or some gaming publisher). FIG. 12 shows the functional components of a multimedia console 100 in which aspects of the presently disclosed subject matter may be implemented. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a FLASH memory device (not shown). Further, ROM 106 may be located separate from CPU 101.

This Console may have a variety of resources available to it, such as, a graphics processing unit (GPU) 108 and a video encoder/video codec (coder/decoder) 114 from a video processing pipeline for high speed and high resolution graphics processing. In this setup, data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community.

Figure 10:
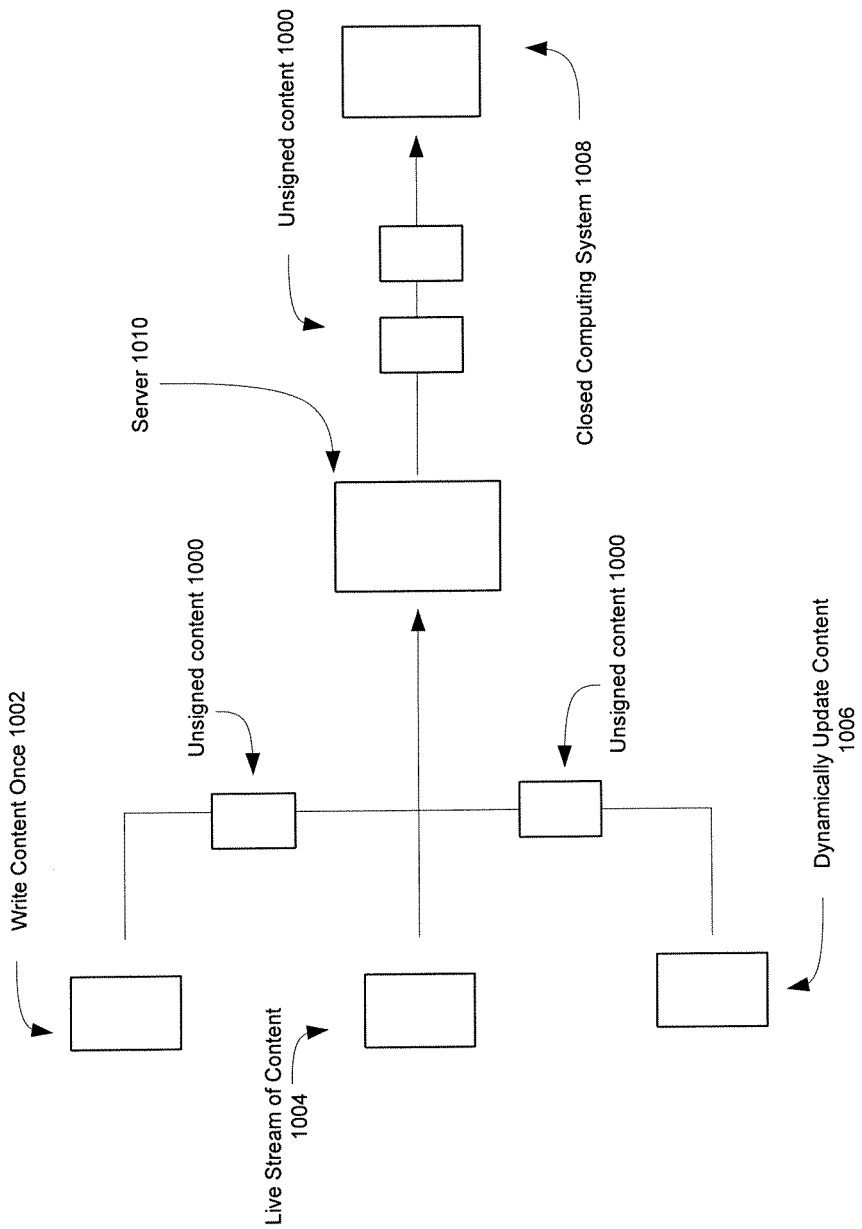
FIG. 10 illustrates a block diagram representing an exemplary non-limiting computing system environment to on which unsigned content can execute in accordance with the presently disclosed subject matter.

The multimedia console depicted in FIG. 10 is a typical multimedia console that may be used to execute a multimedia application, such as, for example, a game. Multimedia applications may be enhanced with system features including for example, system settings, voice chat, networked gaming, the capability of interacting with other users over a network, e-mail, a browser application, etc. Such system features enable improved functionality for multimedia console 100, such as, for example, players in different locations can play a common game via the Internet.

Also, over time, system features may be updated or added to a multimedia application. Rather than requiring the multimedia developer to make significant modifications to the multimedia application to provide these system features, the systems and methods described herein allow a multimedia developer to provide system features through separate system applications that work in conjunction with the multimedia application. For example, a system application may embody functionality related to networked capabilities, thereby enabling a multimedia application to be readily adapted to provide networked capabilities with little work by the multimedia (e.g., game) developer. One such capability is that of system level notifications for multiple and networked users. Making system level notifications part of a system application as opposed to being handled by individual multimedia applications, such as games running on the system, takes handling displaying notifications such as game invitations out of the development process for multimedia application developers and allows them to focus on the multimedia application itself.

As mentioned above, while exemplary embodiments of the present subject matter have been described in connection with various computing devices and network architectures, the underlying concepts may be applied to any computing device or system in which an input device may be utilized to control the device or system. For instance, the algorithm(s) and hardware implementations of the discussed aspects may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting.

As mentioned, the various techniques described herein may be implemented in connection with hardware or software or, where appropriate, with a combination of both. Thus, the methods and apparatus of the present subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed aspects. In the case of program code execution on programmable computers, the computing device generally includes a processor, a storage medium readable by the processor (including volatile and non-volatile memory and/or storage elements), at least one input device, and at least one output device.

One or more programs that may implement or utilize any software provided in accordance with these aspects are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the presently disclosed aspects may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the presently disclosed subject matter. When implemented on a general-purpose processor, the program code combines with the processor to provide a unique apparatus that operates to invoke the functionality of the present subject matter. Additionally, any storage techniques used in connection with the present aspects may invariably be a combination of hardware and software.

While the aspects described above have been described in connection with the preferred embodiments of the various figures, it is to be understood that other similar embodiments may be used or modifications and additions may be made to the described embodiment for performing the same function without deviating therefrom. For example, one skilled in the art will recognize that the methods, as described in the present application may apply to any computing device or environment, such as a gaming console, handheld computer, portable computer, etc., whether wired or wireless, and may be applied to any number of such computing devices connected via a communications network, and interacting across the network.

Furthermore, it should be emphasized that a variety of computer platforms, including handheld device operating systems and other application specific operating systems are contemplated, especially as the number of wireless networked devices continues to proliferate. Still further, functionality of the present subject matter may be implemented in or across a plurality of processing chips or devices, and storage may similarly be effected across a plurality of devices. Therefore, the presently discussed aspects should not be limited to any single embodiment, but rather should be construed in breadth and scope in accordance with the appended claims.

What is claimed:

1. A computing system for accessing a protected resource managed by the computing system, the computing system comprising:
   a processor;
   an unsigned software component to generate a resource call to the protected resource;
   an access layer comprising a plurality of sublayers to receive the resource call from the unsigned software component; and
   at least one application programming interface comprising a plurality of sub-interfaces that provide the resource call from the plurality of sublayers of the access layer to the protected resource,
   wherein both signed software components that have passed a certification process and unsigned software components are executable on the computing system.

2. The computing system according to claim 1, wherein the protected resource comprises a graphics component, an audio component, a math component, a storage component, or an input component.

3. The computing system according to claim 2, wherein the application programming interface comprises one sub-interface to correspond with the graphics component, audio component, math component, storage component, or input component.

4. The computing system of claim 1, wherein the protected resource is managed by a gaming console.

5. The computing system of claim 1, wherein the protected resource is managed by a general purpose computer.

6. The computing system according to claim 1, wherein the protected resource uses a native code format.

7. The computing system according to claim 1, wherein the resource call is generated in a user mode.

8. A method for providing access to a protected resource, the method comprising:
   receiving, by an access layer of a computing device, in one sublayer of the access layer comprising a plurality of sublayers, a resource call from an unsigned software component of the computing device operating in a user mode;

validating, by the computing device, the resource call; and exposing, by the computing device, an application programming interface to receive the resource call, the application programming interface comprising a plurality of sub-interfaces that provide the resource call from the plurality of sublayers of the access layer to the protected resource, wherein both signed software components that have passed a certification process and unsigned software components are executable on the computing device.

9. The method of claim 8, wherein validating the resource call comprises:

copying memory associated with the resource call from a user mode memory location to a kernel mode memory location;

validating a parameter of the resource call;

translating a kernel mode point created to handle the resource call to a handle; and returning the handle in user mode.

10. The method of claim 9, wherein the parameter comprises enumeration value set validation, range checking, or null reference checking.

11. The method of claim 8, further comprising presenting the resource call to the protected resource.

12. The method of claim 8, wherein the computing device is a gaming console or a general purpose computer.

13. The method of claim 8, wherein the resource call received from the unsigned software component is in managed code format.

14. The method of claim 8, wherein presenting the resource call further comprises translating the received managed code format into a native language format used by the protected resource.

15. A computer-readable storage medium having stored thereon computer-executable instructions to provide access to a protected resource in a computing system, the computer-executable instructions comprising instructions to:

generate a resource call from an unsigned software component operating in a user mode for the protected resource operating in a kernel mode;

receive the resource call in one sublayer of an access layer comprising a plurality of sublayers;

validate the resource call; and expose an application programming interface to perform the resource call, the application programming interface comprising a plurality of sub-interfaces that provide the resource call from the plurality of sublayers of the access layer to the protected resource, wherein both signed software components that have passed a certification process and unsigned software components are executable on the computing system.

16. The computer-readable storage medium of claim 15, wherein the application programming interface translates the resource call from the user mode to the kernel mode.

17. The computer-readable storage medium of claim 15, wherein the protected resource corresponds to a protected graphics resource, corresponds to a protected audio resource, corresponds to a protected storage resource, corresponds to a protected math resource, or corresponds to a protected input resource.

18. The computer-readable storage medium of claim 15, wherein the instruction to validate the resource call comprises instructions to validate a parameter of the resource call.

19. The computer-readable storage medium of claim 18, wherein the parameter comprises enumeration value set validation, range checking, or null reference checking.

* * * * *